UNITED STATES PATENT OFFICE.

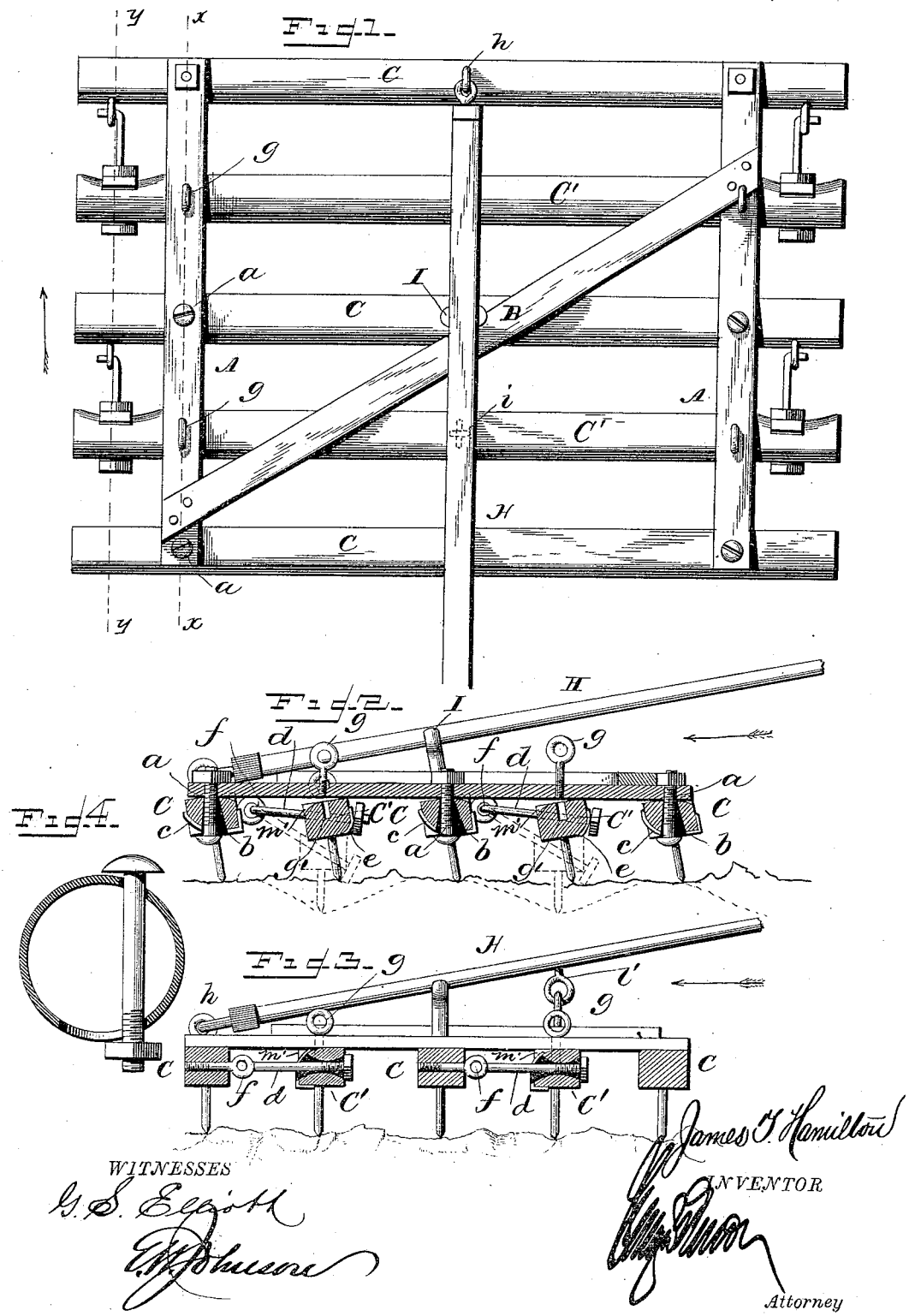

JAMES T. HAMILTON, OF OMAHA, NEBRASKA.

HARROW.

SPECIFICATION forming part of Letters Patent No. 351,175, dated October 19, 1886.

Application filed December 3, 1885. Serial No. 184,616. (No model.)

*To all whom it may concern:*

Be it known that I, JAMES T. HAMILTON, a citizen of the United States of America, residing at Omaha, in the county of Douglas and State of Nebraska, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in harrows; and it consists in the construction and combination of the parts, as will be hereinafter fully set forth, and specifically pointed out in the claim.

In the accompanying drawings, which illustrate my invention, Figure 1 is a plan view of a harrow constructed in accordance with my invention. Fig. 2 is a sectional view taken through the line $x\ x$ of Fig. 1, showing the toothed sections adjusted to swing into depressions in the ground. Fig. 3 is also a sectional view taken through the line $y\ y$ of Fig. 1, and Fig. 4 is a sectional view of a modification of my invention.

A A represent the cross-beams of the harrow-frame, which are rigidly attached to each other by a diagonal beam, B, and to the beams A are attached the bars C and C', which carry harrow-teeth. The bars C C are connected or pivotally attached to the cross-beams A by bolts $a$, which pass through said beams A and through tapered or beveled holes $b$ in the bars C. Under the bars C are placed slotted washers $c$, upon which the heads of said bolts $a$ will bear, so as to prevent undue wear of the wood. The washers $c$ extend upwardly on each side of the bars C and re-enforce the same opposite the openings $b$, thus serving a double purpose. Between the bars C C and parallel thereto are arranged bars C' C', also carrying harrow-teeth. The bars C' are cut away or rounded at one of their upper corners, as shown at $m'$, so that the upper portion of said bars may lie at an angle with the beams A, and the opposite lower edges of said bars C' are also cut away, as shown at $e$, so that the nut of the bolt $d$ will have a flat bearing-surface.

The bars C' are pivotally attached to the bars C by hooks $f$, one end of which enters eyes in the bars C, while the other end passes through tapered openings in the bar C', so as to permit the same to have a rocking movement upon the bolts $d$. The object of pivotally connecting the bar C' to the bars C is to allow said bars C' to have an independent pivotal movement, so that the teeth attached to said bars will enter depressions in the ground, as shown by dotted lines, Fig. 2.

The beams A are provided with screw-eyes, bolts, or any suitable device, $g$, which pass through the same, and are adapted to enter perforations $g'$ in the bars C', so that said bars can be rigidly attached to the beam when desired.

The front bars, C C, are provided with screw-eyes $h$, which are located near their centers, said screw-eyes being adapted to receive an eye on the end of the lever H, which lever is employed for raising the harrow when it is desired to free the same from trash, and the center beam, C, of the harrow is provided with an upwardly-projecting bar, I, with a forked end, upon which said lever may rest, said forked bar serving as a fulcrum for the lever H. The rear bar, C', is provided with a hook, $i$, (dotted lines, Fig. 1,) with which the eye $i'$, attached to the lever H, engages, for the purpose of lifting the harrow when desired.

It will be noted that when it is desired to employ a harrow having vertical teeth the parts are organized as shown in Fig. 3—that is to say, the lever H is placed in a reversed position from what it would occupy when inclined teeth are desired—the bolts being securely attached to the bars C' C' so as to hold the parts immovably upon each other. When the parts are organized, as shown in Fig. 2, the bars C C C will be allowed a slight rocking movement upon the bolts $a\ a$, and normally the teeth attached to the bars C C will incline rearwardly. In passing over ground in which there are depressions the teeth which are carried by the bars C' C' will drop into said depressions, so as to harrow up the surface thereof. The bolts $g$ are only employed when it is desirable to attach the bars C' rigidly to the harrow-frame, as shown in Fig. 3.

The harrow hereinbefore described may be made of tubular or angular iron and the teeth secured to the same in the usual manner, said bars being connected to the frames by bolts which pass through a slot in the tubular bars, as shown in Fig. 4.

It will be seen that in a harrow constructed as hereinbefore described the bars C′, when pivotally connected to the forward bars, will adjust themselves to the dead furrows or inequalities of the ground, and that by providing the tooth-carrying bars C at the point to which they are connected to the beams A with tapered perforations, through which the connecting-bolts pass, said bars will adjust themselves at an angle so as to allow trash to pass under them or vertically according to the direction of the draft, and that a washer, over which pass the nuts of the bolts, will protect the bars from wear and re-enforce the same, and that by providing screw-bolts $g$ or any suitable device the hinged bars C can be attached rigidly to the beams A, so that the teeth will be vertical, thus making a pulverizing-harrow, and that by providing the bars C and C′ with hooks and the lever H with eyes the harrow can be easily handled when at work and trash freed from the teeth.

I claim—

In a harrow, the combination of the frame, of the teeth-carrying bars C and C′, which are connected thereto, substantially as shown, and provided with hooks $h$, the upwardly projecting forked arm I, attached to the center bar, a lever, H, having an eye secured to its end, and intermediate eyes, $i'$, the parts being organized substantially as shown, and for the purpose set forth.

In testimony whereof I affix my signature in presence of two witnesses.

JAMES T. HAMILTON.

Witnesses:
F. P. BONNELL,
J. M. MCELHINNEY.